(12) United States Patent
Adams (10) Patent No.: US 9,090,485 B2
(45) Date of Patent: Jul. 28, 2015

(54) CORE COLUMN SIMULATOR FOR A WASTEWATER BIOTREATMENT SYSTEM AND METHODS OF USE

(76) Inventor: Carl E. Adams, Nashville, TN (US)

( * ) Notice: Subject to any disclaimer, the term of this patent is extended or adjusted under 35 U.S.C. 154(b) by 1292 days.

(21) Appl. No.: 12/902,700

(22) Filed: Oct. 12, 2010

(65) Prior Publication Data

US 2012/0072196 A1    Mar. 22, 2012

Related U.S. Application Data

(60) Provisional application No. 61/384,807, filed on Sep. 21, 2010.

(51) Int. Cl.
| | |
|---|---|
| *G01N 17/00* | (2006.01) |
| *C02F 3/00* | (2006.01) |
| *C02F 3/12* | (2006.01) |
| *C02F 3/30* | (2006.01) |
| *C02F 101/32* | (2006.01) |

(52) U.S. Cl.
CPC . *C02F 3/006* (2013.01); *C02F 3/12* (2013.01); *C02F 3/30* (2013.01); *C02F 2101/322* (2013.01); *C02F 2209/02* (2013.01); *C02F 2209/03* (2013.01); *C02F 2209/06* (2013.01); *C02F 2209/08* (2013.01); *C02F 2209/10* (2013.01); *C02F 2209/11* (2013.01); *C02F 2209/14* (2013.01); *C02F 2209/22* (2013.01); *C02F 2209/38* (2013.01); *C02F 2209/40* (2013.01)

(58) Field of Classification Search
CPC .......... C02F 2101/322; C02F 2209/02; C02F 2209/03; C02F 2209/06; C02F 2209/08; C02F 2209/10; C02F 2209/11; C02F 2209/14; C02F 2209/22; C02F 2209/38; C02F 2209/40; C02F 3/006; C02F 3/12; C02F 3/30; C02F 3/1242; C02F 3/1247
USPC .......................... 73/865.9, 865.6; 703/10, 11
See application file for complete search history.

(56) References Cited

U.S. PATENT DOCUMENTS

| | | | |
|---|---|---|---|
| 5,466,604 A | * | 11/1995 | Yang et al. ................. 435/286.1 |
| 5,766,459 A | | 6/1998 | Adams, Jr. |
| 5,830,351 A | | 11/1998 | Adams, Jr. |
| 6,224,773 B1 | | 5/2001 | Adams, Jr. |

* cited by examiner

*Primary Examiner* — Daniel S Larkin
*Assistant Examiner* — Jamar Ray
(74) *Attorney, Agent, or Firm* — Polsinelli PC (57) ABSTRACT

A core column simulator device and methods of assessing the efficacy of a wastewater biotreatment system using the core column simulator device are disclosed.

7 Claims, 2 Drawing Sheets

CORE COLUMN SIMULATOR FOR A WASTEWATER BIOTREATMENT SYSTEM AND METHODS OF USE

CROSS-REFERENCE TO RELATED APPLICATIONS

This application claims the priority of U.S. provisional application No. 61/384,807, filed Sep. 21, 2010, which is hereby incorporated by reference in its entirety.

FIELD

The present disclosure generally relates to devices and methods for the assessment of the performance of wastewater treatment systems. In particular, the present disclosure relates to a core column simulator device and methods of assessing the efficacy of a wastewater biotreatment system at eliminating wastewater contaminants such as volatile organic compounds.

BACKGROUND

The typical operations of a large-scale chemical processing facility such as a refinery may generate significant amount of hazardous air pollutants (HAP) as a component of the off-gas released from storage vessels, process vents, and wastewater equipment associated with refinery operations. Governmental regulations typically require the removal of a significant portion of these off-gas HAPs. For example, the USEPA National Emission Standards for Hazardous Air Pollutants (NESHAP) requires the removal of 95% or more of HAPs prior to releasing the off-gases into the environment. Regulations are even more stringent for volatile organic compounds such as benzene or VOC; the Benzene or VOC Waste Operations NESHAP regulations require 98% removal of off-gas benzene or VOC using one or more approved control technologies.

Commonly used control technologies include vapor phase adsorption, in which the benzene and other VOCs are selectively collected out of the out-gas on the surface of a porous solid such as activated carbon. Another common control technology used to eliminate VOCs from the off-gases is incineration by thermal incinerators, such as flares, or catalytic incinerators, such as fluid-bed catalytic incinerators, in which a combustion reaction is used to convert the VOCs into $CO_2$ and water. Most of the commonly used control technologies are typically expensive to operate and generate high carbon footprints. Alternative Control Devices including bioreactors, such as activated sludge biotreatment devices, have more recently just begun to gain regulatory acceptance and use in industry.

Activated sludge biotreatment devices eliminate the VOCs in off-gases by venting the off-gases through a tank containing the activated sludge which includes various microbes such as bacteria and protozoa. The activated sludge in the tank of the biotreatment devices may digest the VOCs, convert the VOCs into additional biomass, biodegrade the VOCs into $CO_2$ and water, or any combination of these treatments. The activated sludge may be recycled indefinitely, and the activated sludge biotreatment devices may be operated at minimal cost and energy consumption. Once established, activated sludge biotreatment devices may prove to be highly efficient and sustainable Alternative Control Devices.

When implementing the use of any Alternative Control Device in an industrial setting, full-scale verification of the performance of the control technology may be conducted to ensure that the control technology possesses sufficient capacity and robustness to function effectively under the full range of operating conditions experienced in the industrial environment, and to demonstrate regulatory compliance. In the case of bioreactor devices such as activated sludge biotreatment devices, a flux chamber is a common method of evaluating VOC emissions from a full-scale, operating bioreactor. A Flux Chamber monitors off-gas emissions directly from the surface of the bioreactor using VOC measurements obtained by one or more small floating plastic spheres at selected sampling points on the surface of the bioreactor tank. However, one disadvantage of the Flux Chamber method is that there exists no expedient control of the operating parameters of the bioreactor during performance testing, and due to the exposure of the small plastic spheres to the external environment, the Flux Chamber measurements may be highly susceptible to external conditions, such as a stray oil drop. As a result, there may be limited ability of the full-scale operating biosystem to modify operations in order to correct an abnormal occurrence, or to adjust operating conditions in order to identify the maximum stress conditions at which the biosystem may operate effectively.

A need exists in the art for a device which may be used for the assessment of the efficacy of a bioreactor device that possesses expedient control of the operating parameters of the bioreactor device and is not susceptible to external conditions. Such a device may be used to assess the efficacy of the bioreactor device as an Alternative Control Device for the removal of VOCs such as benzene or other VOCs from industrial off-gases in order to demonstrate regulatory compliance or to explore the range of conditions under which the bioreactor may operate effectively. Further, such a device may be used to establish initial operating conditions for the bioreactor device based on the on-site environmental conditions, or the device may be used to explore the effects of variation of the operating conditions on the efficacy of the bioreactor device in order to enhance the efficacy of the device.

SUMMARY OF THE INVENTION

In an aspect, a core column simulation device for assessing an efficacy of a wastewater biotreatment system is provided that includes a column simulation subsystem for simulating an operation of the wastewater biotreatment system using a sample obtained from the wastewater biotreatment system. The sample extraction subsystem is operatively connected to the column simulation subsystem and to the wastewater biotreatment system. The sample extraction subsystem transfers an amount of fluid that includes an aqueous suspension of biomass from the wastewater biotreatment system into a sample volume within the column simulation subsystem at a simulated extraction rate. This simulated extraction rate is equivalent or representative of a full-scale rate through a corresponding volume of a core of wastewater extending a total water depth within the wastewater biotreatment system.

The device also includes a sample return subsystem to transfer an amount of mixed liquor from the column simulation subsystem to the wastewater biotreatment system at a return rate sufficient to maintain a constant amount of fluid within the sample volume. This sample return subsystem is operatively connected to the column simulation subsystem and to the wastewater biotreatment system. The device further includes an aeration subsystem to introduce an aeration gas into the sample volume at a simulated aeration rate that is representative of a volumetric aeration rate of the wastewater treatment system; the aeration subsystem is operatively connected to the column simulation subsystem. Also included in the device is a gas emission subsystem to release a gas mixture from the column simulation subsystem that is operatively connected to the column simulation subsystem. A measurement subsystem is also operatively connected to the column simulation subsystem to monitor at least one property of at least one fluid associated with an assessment performed by the column simulation device.

In another aspect, a core column simulation device for assessing an efficacy of a wastewater biotreatment system is provided. In this aspect, the device includes a cylinder enclosing an interior volume that includes an upper end and a lower end. The lower end is situated in proximity to a base of a treatment tank of the wastewater biotreatment system.

The device in this aspect also includes a gas vent pipe that includes a gas connection end and a gas outlet end opposite to the gas connection end. The gas connection end is connected in fluid communication with the upper end of the cylinder. A sample return pipe is also included with a sample return connection end and a sample outlet end opposite to the sample return connection end. The sample return connection end is connected in fluid communication with the upper end of the cylinder and the sample outlet end is connected in fluid communication with the wastewater biotreatment system.

Further, the device includes a sample inlet pipe with a sample inlet connection end and a wastewater biotreatment system connection end opposite to the sample inlet connection end. The sample inlet connection end is connected in fluid communication with the lower end of the cylinder and the wastewater biotreatment system connection end is connected in fluid communication with the wastewater biotreatment system. A sample pump is operatively connected to the sample inlet pipe between the sample inlet connection end and the wastewater biotreatment system connection end. The sample pump receives fluid comprising an amount of biomatter from the wastewater biotreatment system and pumps the fluid into the lower end of the cylinder.

The device in this aspect also includes an aeration pipe that includes an aeration inlet end and an aeration connection end opposite to the aeration inlet end. The aeration connection end is connected in fluid communication with the lower end of the cylinder.

In another aspect, a method is provided for assessing an efficacy of a wastewater treatment system using a core column simulation device similar to the devices described above. The method includes providing the core column simulation device that includes a cylinder, a sample connection pipe, an aeration fitting, a gas vent pipe, a gas sample port, and a gas analysis device. The method also includes pumping an amount of fluid that includes an aqueous suspension of biomass into the cylinder from the wastewater treatment system through the sample connection pipe to obtain a sample inside of the cylinder at a sample extraction rate. Further, the method includes introducing atmospheric air into the sample through the aeration fitting at a simulated aeration rate representative of an operational aeration rate in the wastewater biotreatment system and introducing wastewater into the sample at a simulated wastewater flow rate representative of an operational wastewater flow rate in the wastewater biotreatment system. In this method, a composition of an off-gas emitted from the gas vent pipe is monitored using the gas analysis device operatively connected to the gas vent pipe.

In yet another aspect a method of assessing a volatile organic gas elimination efficacy of a wastewater treatment system using a core column simulation device is provided. The method includes providing the core column simulation device that includes a cylinder, a sample connection pipe, an aeration fitting, a gas vent pipe, a gas sample port, and a gas analysis device. The method also includes pumping an amount of fluid that includes an aqueous suspension of biomass into the cylinder from the wastewater treatment system through the sample connection pipe to obtain a sample inside of the cylinder at a sample extraction rate. Further, the method includes introducing atmospheric air into the sample through the aeration fitting at a simulated aeration rate representative of an operational aeration rate in the wastewater biotreatment system and introducing wastewater into the sample at a simulated wastewater flow rate representative of an operational wastewater flow rate in the wastewater biotreatment system.

This method additionally includes injecting at least one calibration gas that includes at least one volatile organic compound through the aeration fitting at a gradually increasing calibration gas insertion rate and monitoring a composition of an off-gas emitted from the gas vent pipe using the gas analysis device operatively connected to the gas vent pipe. The method also includes calculating an elimination factor that includes an amount of vented calibration gas as a percentage of an amount of injected calibration gas, and comparing the elimination factor to an elimination standard to assess the efficacy of the wastewater biotreatment system.

In still yet another aspect, an instrumented wastewater biotreatment system is provided that includes the core column simulation device operatively connected to a wastewater biotreatment device, as described above.

Other aspects of the core column simulation device and methods of using the core column simulation device are described below.

Corresponding reference characters and labels indicate corresponding elements among the views of the drawings. The headings used in the figures should not be interpreted to limit the scope of the claims.

DETAILED DESCRIPTION

A core column simulation device for assessing the efficacy of a wastewater biotreatment system is provided that overcomes limitations of previous assessment devices. The core column simulation device includes a closed cylinder operatively connected to a wastewater biotreatment system such that a sample of the activated sludge from a tank within the wastewater biotreatment system may be circulated through the closed cylinder at a rate representative of the rate of movement of the activated sludge in the full-scale wastewater biotreatment system. The sample of activated sludge may be operated as a bioreactor in parallel to the full-scale wastewater biotreatment system to perform the same function, such as the removal of benzene or VOC from an off-gas input stream. Thus, the core column simulation device is analogous to a core sample of the full-scale wastewater biotreatment system that may be operated in the same manner as the full-scale system.

The core column simulation device may also include an array of pumps, valves, and other controls that may be varied in order to vary the operating parameters of the core column simulation device such as dwell time of the activated sludge within the closed cylinder or benzene or VOC concentration in the off-gas input stream. Because the core column simulation device operates in parallel to the full-scale wastewater biotreatment system, the operating conditions of the core column simulation device may be varied without affecting the operation of the full-scale wastewater biotreatment system. Using this capability, the core column simulation device may be used to assess the sensitivity of the efficacy of the full-scale wastewater biotreatment system to variations in any operating parameter within an arbitrary range, either in isolation, or in combination with one or more other operating parameters.

Methods of using the core column simulation device may include running the core column simulation device at the same operating conditions as the full-scale bioreactor in order to demonstrate the efficacy and functional capacity of the full-scale bioreactor for purposes including but not limited to validating the design of the full-scale bioreactor or demonstrating regulatory compliance of the full-scale bioreactor. Other methods of using the core column simulation device may include varying the operating conditions of the core column simulation device to assess the effect of the variations on the efficacy of the full-scale bioreactor in order to assess the robustness or to enhance the design of the full-scale system.

Aspects of the core column simulation device and methods of using the core column simulation device are described further below.

I. Core Column Simulation Device

Figure 1:
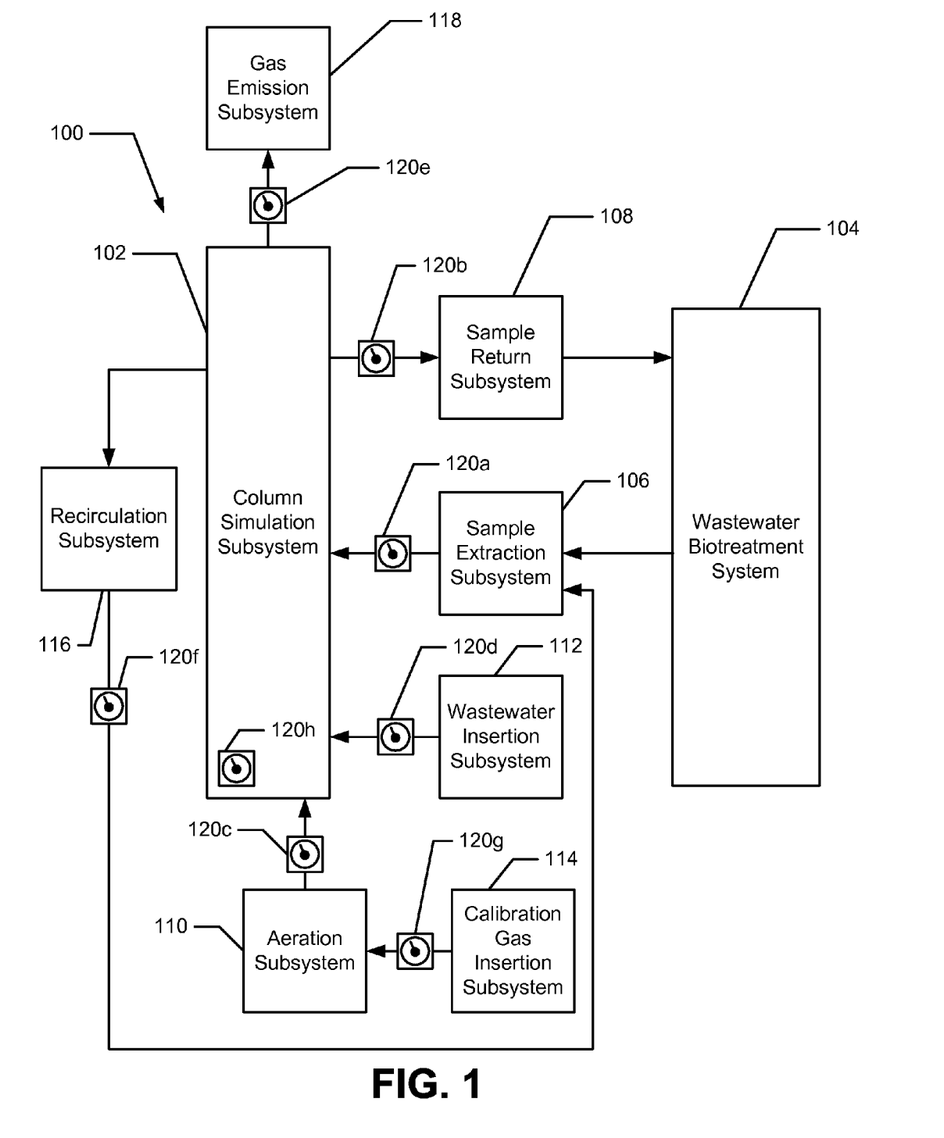
FIG. 1 is a flowchart diagram illustrating the subsystems of a core column simulation device in accordance with an aspect of the invention.

FIG. 1 is a flow chart diagram summarizing the major components of a core column simulation device 100 that may be used to assess the efficacy of a wastewater biotreatment system 104. The core column simulation device 100 simulates the operation of the wastewater biotreatment system 104 using a sample obtained from the wastewater biotreatment system 104. The sample may be an amount of activated sludge from the wastewater biotreatment system 104 that may include a suspension of one or more species of microorganisms such as bacteria or protists capable of biodegrading and/or digesting one or more organic compounds such as benzene or VOC or other volatile organic compounds (VOCs).

The core column simulation device 100 may include a column simulation subsystem 102 for simulating the operation of the wastewater treatment system 104 using a sample obtained from the wastewater biotreatment system 104, a sample extraction subsystem 106 to transfer an amount of fluid comprising an aqueous suspension of biomass from the wastewater biotreatment system 104 into a sample volume within the column simulation subsystem 102, and a sample return subsystem 108 to transfer an amount of mixed liquor from the column simulation subsystem 102 to the wastewater biotreatment system 104. Mixed liquor may be defined as a fluid mixture including the fluid transferred from the wastewater treatment system 104, along with any added wastewater, recirculated sample fluid, and dissolved calibration or atmospheric gases. The sample extraction subsystem 106 as well as the sample return subsystem 108 may be operatively connected to both the column simulation subsystem 102 and the wastewater treatment system 104 and may function as fluid conduits for the transfer of fluids to and from the column simulation subsystem 102 at controlled flow rates.

The core column simulation device 100 may also include an aeration subsystem 110 to introduce atmospheric air into the sample volume of the column simulation subsystem 102 at a controlled rate in order to aerate the sample to facilitate the aerobic digestive and biodegradation processes of the aqueous suspension of biomass in the sample. The aeration subsystem 110 may be operatively connected to the column simulation subsystem 102 and functions as a gas conduit into the column simulation subsystem 102. A calibration gas insertion subsystem 114 may also be included in the core column simulation device 100 to introduce a calibration gas such as benzene or VOC into the column simulation subsystem 102 at a controlled rate by injecting the calibration gas into the atmospheric air from the aeration subsystem 110 before it enters the column simulation subsystem 102. The calibration gas insertion subsystem 114 may be operatively connected to the aeration subsystem 110 and may function as a conduit for the control gas.

The wastewater insertion subsystem 112 may also be included within the core column simulation device 100 to introduce an amount of wastewater into the column simulation subsystem 102 at a controlled rate in order to simulate the treatment of wastewater by the wastewater biotreatment system 104 using the core column simulation device 100. The wastewater insertion subsystem 112 may be operatively connected to the column simulation subsystem 102 and may function as a wastewater conduit.

In order to simulate the anoxic recycling function of the full-scale wastewater treatment system 104, the core column simulation device 100 may further include a recirculation subsystem 116. The recirculation subsystem 116 recirculates the fluid within the column simulation subsystem 102 at a controlled flow rate. The recirculation subsystem 116 may be operatively connected to the column simulation subsystem 102 and the sample extraction subsystem 106 and may function as a fluid conduit between these two subsystems.

The emission of a gas mixture from the column simulation subsystem 102 may be released through a gas emission subsystem 118 that may be operatively connected to the column simulation subsystem 102 and may function as a conduit to release the gas mixture into the surrounding atmosphere. The composition of the emitted gas mixture, as well as many other operating parameters and conditions defined in detail below may by monitored by a measurement subsystem 120$a$-$g$ that may include a variety of measurement devices. As illustrated in FIG. 1, the measurement subsystem 120$a$-$g$ may be operatively connected to any one or more of the subsystems of the core column simulation device 100.

Specific aspects of each of the subsystems of the core column simulation device 100 as well as the wastewater biotreatment system 104 are discussed in further detail below.

a. Column Simulation Subsystem

Referring to FIG. 1, the core column simulation device 100 may include a column simulation subsystem 102 that includes a closed container in which the sample obtained from the wastewater biotreatment system 104 may be subjected to controlled operating conditions independently of the wastewater biotreatment system 104 in order to simulate in parallel the operation of the full-scale wastewater biotreatment system 104. In addition, the operating conditions and resulting products of the core column simulation device 102 may be monitored throughout the device 100 in order to assess the efficacy of the wastewater biotreatment system 104 or to obtain information to be used to demonstrate regulatory compliance, to evaluate system performance, to refine the system design, or to trouble-shoot system malfunctions of the wastewater biotreatment system 104. The control and monitoring of operating conditions and resulting products of the core column simulation device 102 are provided by additional subsystems included in the core column simulation device 102.

Figure 2:
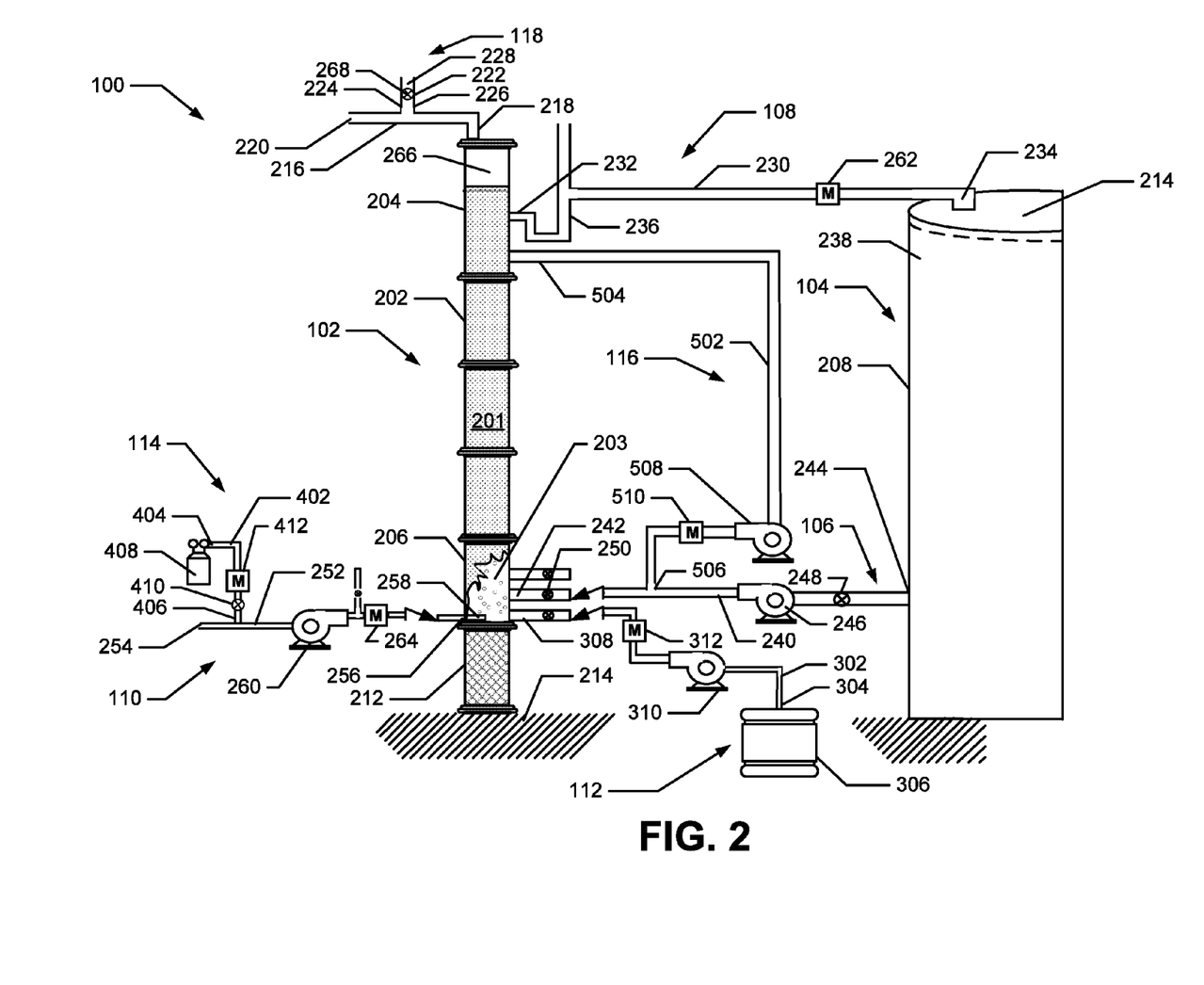
FIG. 2 is a schematic diagram of a core column simulation device in accordance with an aspect of the invention.

Referring to FIG. 2, the column simulation subsystem 102 includes a cylinder 202 enclosing an interior volume 201 containing the sample transferred from the wastewater biotreatment system 104. The cylinder 202 may include an upper end 204 and a lower end 206, and the lower end 206 may situated in proximity to a base of a treatment tank 208 of the wastewater biotreatment system 104. The lower end 206 may be attached to a support structure 212 secured to the ground 214 or other suitable base. The upper end 204 and the lower end 206 may be closed or sealed using any known sealing device including but not limited to end caps or plugs, in order to form a sealed interior volume 201.

The cylinder 202 may be constructed of any suitable material known in the art that possesses sufficient strength and durability to contain the sample and maintain structural integrity during installation and use. The cylinder material may be further selected to be non-reactive with the various compounds included within the sample, the wastewater, the aeration air and the calibration gas. The cylinder material may also be selected to be non-toxic and biocompatible with the aqueous suspension of biomass in the sample. Non-limiting examples of materials suitable for the construction of the cylinder 202 include cast iron, stainless steel, aluminum, and polymers such as PVC.

In an aspect, the cylinder 202 may be situated vertically alongside a tank 208 of a wastewater biotreatment system 104 containing the fluid from which the sample is extracted. In another aspect, the cylinder 202 may be constructed of a series of flanged segments, as shown in FIG. 2 or the cylinder 202 may be constructed as a single continuous unit.

Any suitable diameter of cylinder 202 known in the art may be selected for the construction of the device 100. The cylinder diameter may be selected based on any one or more of at least several factors including, but not limited to, the strength of the cylinder material, the diameter of additional connecting pipes connected to the cylinder 202, the weight of the cylinder as a consideration for the transportation and set-up of the system 102, the desired volume of sample to be enclosed within the internal volume 201 of the cylinder 202, and the height and tank volume of the water biotreatment system 104 to be simulated by the core column simulation device 100. In one aspect, the internal diameter of the cylinder 202 may range from about 1 inch to about 36 inches.

As used herein, a pipe refers to any flexible or rigid member that acts as a conduit to transfer any fluid including, but not limited to, a liquid or a gas from one container to another container. For example, a pipe may transfer a fluid from the water biotreatment system 104 to the cylinder 202. The pipe may act as a conduit to transfer a fluid from one location to a second location within the same container. In another example, a pipe may transfer a fluid from the upper end 204 to the lower end 206 within the same cylinder 202. Non-limiting examples of pipes include pipes, hoses, tubes, channels, grooves, and the like.

The total height of the cylinder 202 may any height ranging between about 10% and about 150% of the total height of the tank 208 of the wastewater biotreatment system 104. In an aspect, the height of the cylinder 202 may be about 110% of the total height of the tank to provide sufficient capacity to contain a sample within the internal volume 201 that extends to a height that is essentially equal to the height of the fluid in the tank 208 of the wastewater biotreatment system 104. Utilizing a sample height that is essentially equal to the height of the fluid in the tank 208 may enhance the fidelity of the simulation of the operation of the wastewater biotreatment system 104 by the core column simulation device 100.

The volume of the sample contained within the internal volume 201 of the cylinder 202 may be selected to be a sufficiently small fraction of the volume of fluid contained within the tank 208 so as not to significantly impact the operation of the wastewater biotreatment system 104 by the removal of the sample. In addition, the volume of the sample may be sufficiently large to fill the internal volume 201 up to a height equal to the height of the fluid within the tank 208 of the wastewater biotreatment system 104. Further, the volume of the sample may be selected to achieve substantially similar function of the core column simulation device 100 and the wastewater biotreatment system 104. In an aspect, the volume of the sample may range between about 0.01% and about 1% of the aeration volume within the tank 208 of the wastewater biotreatment system 104.

b. Sample Extraction Subsystem

The sample extraction subsystem 106 transfers an amount of a fluid such as activated sludge from the tank 208 of the wastewater biotreatment system 104 into an internal volume 201 of the cylinder 202. The fluid transferred from the wastewater biotreatment system 104 makes up the sample within the internal volume 201 that may be used to simulate the operation of the wastewater biotreatment system 104.

The sample extraction subsystem 106 may include a sample inlet pipe 240 that includes a sample inlet connection end 242 and a wastewater biotreatment system connection end 244 opposite to the sample inlet connection end 242. The sample inlet connection end 242 is connected in fluid communication with the lower end 206 of the cylinder 202, and the wastewater biotreatment system connection end 244 is connected in fluid communication with the wastewater biotreatment system 104, forming a conduit through which fluid may be transferred from the tank 208 of the wastewater biotreatment system 104 into the internal volume 201 of the cylinder 202 at a controlled flow rate. In an aspect, the sample inlet connection end 242 may be connected in fluid communication with the lower end 206 of the cylinder 202 below the sample return connection end 232.

The sample extraction subsystem 106 may also include a sample pump 246 operatively connected to the sample inlet pipe 240 between the sample inlet connection end 242 and the wastewater biotreatment system connection end 244. The sample pump 246 may receive fluid from the wastewater biotreatment system 104 and pump the fluid into the lower end 206 of the cylinder 202.

In an aspect, the fluid may be transferred in a batch fashion in which an amount of fluid is transferred into the internal volume 201 to form the sample with no additional fluid transferred from the wastewater biotreatment system 104, resulting in a static sample volume 203 within the internal volume 201. In another aspect, the sample extraction subsystem 106 may transfer the fluid continuously at a simulated extraction rate that may be equivalent to, or representative of, the full-scale rate through a corresponding volume of a core of wastewater within the full-scale wastewater biotreatment system extending the total water depth of the wastewater biotreatment system 104. The full scale rate may be defined here as the volumetric rate of fluid transfer from a settling area of the wastewater biotreatment system 104 to an aeration volume of the system 104 during a process of reclaiming the biomass generated by the wastewater biotreatment system 104.

In yet another aspect, the simulated extraction rate may be increased or decreased to assess the sensitivity of the operation of the wastewater biotreatment system 104 to fluctuations in the clarifier underflow rate in order to characterize the robustness of the system 104. In still another aspect, the simulated extraction rate may be altered in order to identify a clarifier underflow rate at which the efficacy of the wastewater biotreatment system 104 is enhanced or degraded relative to existing operating conditions.

c. Sample Return Subsystem

The sample return subsystem 108 transfers an amount of mixed liquor from the column simulation subsystem 102 to the wastewater biotreatment system 104 at a controlled return rate. In an aspect, the return rate may be selected to maintain a constant amount of fluid within the internal volume 201 of the cylinder 202. Referring again to FIG. 2, the sample return subsystem 108 may include a sample return pipe 230 that includes a sample return connection end 232 and a sample outlet end 234 opposite to the sample return connection end 232. The sample return connection end 232 is connected in fluid communication with the upper end 204 of the cylinder 202 and the sample outlet end 234 is connected in fluid communication with the wastewater biotreatment system 104. In an aspect, the sample outlet end 234 opens over the upper opening 214 in the tank 208 of the wastewater biotreatment system 104.

In another aspect, the sample return subsystem 108 may also include a sample return flow meter 262 operatively connected to the sample return pipe 230 between the sample return connection end 232 and the sample outlet end 234 to monitor the return rate. In yet another aspect, the return rate may be determined by timing the amount of time taken to fill a known calibration volume, such as a container or bucket of known volume, with the mixed liquor as it is released from the sample outlet end 234 and then dividing the known volume by the measured time to fill the volume. The volumetric return flow rate may be used in combination with other known quantities such as the cross-sectional area of the opening of the sample outlet end 234 and the cross-sectional area and height of the sample within the internal volume 201 to determine the dwell time of the sample within the internal volume 201.

In yet another aspect, the sample return subsystem 108 may further include a trap 236 situated anywhere along the sample return pipe 230 to prevent the movement of gases into the upper end 204 of the cylinder 202 through the sample return pipe 230.

d. Aeration Subsystem

The aeration subsystem 110 introduces atmospheric air and any injected calibration gases into the internal volume 201 at a simulated aeration rate. In an aspect, the simulated aeration rate may be representative of an aeration rate of the wastewater treatment system. The aeration subsystem 110 includes an aeration pipe 252 that includes an aeration inlet end 254 and an aeration connection end 256 opposite to the aeration inlet end 254, wherein the aeration connection end 256 is connected in fluid communication with the lower end 206 of the cylinder 202, and wherein the aeration inlet end 254 opens to the atmosphere. In an aspect, the aeration connection end 256 may be connected in fluid communication with the lower end 206 of the cylinder 202 below the sample inlet connection end 242.

The aeration subsystem 110 may further include an aeration fitting 258 that contains at least one orifice that opens into the interior volume 201 of the cylinder 202. The aeration fitting 258 may be connected in fluid communication with the aeration connection end 256. The aeration fitting 258 may be any known design and may have a number of orifices ranging from 1 to about 400. The design of the aeration fitting 258 may be selected based on one or more of at least several factors including, but not limited to, the desired aeration flow rate through the sample, the pressure at which the aeration gas is supplied to the aeration fitting 258, the depth of the aeration head 258 below the surface of the sample, and the cross-sectional area of the internal volume 201 within the cylinder 202.

In an aspect, the orifice size and number of orifices may selected in order to match the ratio of volumetric flow rate of the aeration gas divided by the net area of all orifices in the aeration apparatus within the wastewater biotreatment system 104 to the corresponding ratio of the aeration fitting 258. The diameter of each orifice may range from about 1/8 inch to about 1/2 inch depending on number of orifices and the desired aeration flow rate.

The aeration subsystem 110 may further include an aeration pump 260 operatively connected to the aeration pipe 252 between the aeration inlet end 254 and the aeration connection end 256. The aeration pump 260 may receive an amount of air or other aeration gas from the atmosphere or other aeration gas source and pumps the aeration gas into the lower end 206 of the cylinder 202 through the aeration fitting 258.

In another aspect, the aeration subsystem 110 may further comprise an aeration flow meter 264 that is operatively connected to the aeration pipe 252 between the aeration pump 260 and the aeration connection end 256. The aeration flow meter 264 may be used to monitor the aeration flow rate through the aeration head 258.

In one aspect, the simulated aeration rate may be sufficient to result in a ratio of aerial and volumetric flow rate of the aeration gas through the aeration fitting 258 to a total area of the one or more orifices that is essentially matched to the corresponding ratio of the wastewater biotreatment system 104. In another aspect, the aeration flow rate may be varied to assess the sensitivity of the operation of the wastewater biotreatment system 104 to fluctuations in the aeration rate in order to characterize the robustness of the system 104. In still another aspect, the simulated aeration rate may be altered in order to identify a level of aeration at which the efficacy of the wastewater biotreatment system 104 is enhanced or degraded relative to existing operating conditions.

In an additional aspect, the aeration gas may be chosen from air, pure oxygen, a calibration gas such as benzene or VOC, an off-gas from an industrial process, or any combination thereof. For example, pure oxygen may be used as an aeration gas for a wastewater biotreatment system 104 situated in a region of poor air quality or if enhanced biodegradation or digestion by the activated sludge is desired. The calibration gas, if used, may be introduced by a calibration gas insertion subsystem 114.

e. Calibration Gas Insertion Subsystem

The calibration gas insertion subsystem 114 may introduce a calibration gas into the internal volume 201 at a calibration gas insertion rate. The calibration gas insertion subsystem 114 may include a gas insertion pipe 402 that includes a gas inlet end 404 and a gas insertion end 406 opposite to the gas inlet end 404. The gas inlet end 404 may be connected in fluid communication with the aeration pipe 252 between the aeration pump 260 and the aeration inlet end 254.

The calibration gas insertion subsystem 114 may further include at least one calibration gas source 408 that includes an amount of at least one calibration gas. The calibration gas source 408 may be connected in fluid communication with the gas inlet end 404 of the gas insertion pipe 402. In addition, a valve 410 may be operatively installed within the gas insertion pipe between the gas inlet end 404 and the gas connection end 406.

In an aspect, calibration gas insertion subsystem 114 may further include a calibration gas flow meter 412 operatively connected to the gas insertion pipe between the calibration gas source 408 and the gas connection end 406. The calibration gas flow meter 410 may be used to monitor the calibration gas insertion rate. In another aspect the calibration gas insertion rate may be selected that results in a volumetric rate of calibration gas input per unit volume of sample in the internal volume 201 that is essentially matched with the calibration gas insertion rate per unit aeration volume of the wastewater biotreatment system 104. In yet another aspect, the calibration gas insertion rate may be varied in order to assess the sensitivity of the efficacy of calibration gas removal by the wastewater biotreatment system 104 to fluctuations in the input rate of calibration gas. In this aspect, the maximum rate of calibration gas input that still results in effective calibration gas removal by the wastewater biotreatment system 104 may also be determined.

The calibration gas may be any known contaminant gas including, but not limited to, a volatile organic compound (VOC) chosen from benzene, phenol and any other known VOC regulated by MACT regulation. The gas source may be any known pressurized gas storage container including but not limited to a pressurized gas cylinder and a pressurized gas tank. The concentration of the calibration gas inserted into the aeration flow may be any known concentration that results in suitably high concentrations of the calibration gas in the aeration flow. In one aspect, the maximum concentration of the calibration gas in the aeration flow may exceed the maximum capacity of the core column simulation device 100 to eliminate to acceptable levels in the gas emissions of the device 100. For example, if the calibration gas is benzene or VOC, the concentration of the calibration gas may range from about 0.1 ppmv (parts per million by volume) to about 100 ppmv.

f. Waste Water Insertion Subsystem

A wastewater insertion subsystem 112 may be included to introduce an amount of wastewater into the internal volume 201 within the column simulation subsystem 102 at a simulated wastewater flow rate that is representative of a wastewater flow rate of the wastewater biotreatment system 104.

The wastewater insertion subsystem 112 may include a wastewater insertion pipe 302 that may include a wastewater inlet end 304 and a wastewater connection end 308 opposite to the wastewater inlet end 304. The wastewater connection end 308 may be connected in fluid communication with the lower end 206 of the cylinder 202. The wastewater insertion subsystem 112 may also include a wastewater source 306 that contains an amount of wastewater. In an aspect, the wastewater source 306 is connected in fluid communication with the wastewater inlet end 304. A wastewater pump 310 may be operatively connected to the wastewater insertion pipe 302 between the wastewater connection end 308 and the wastewater inlet end 304, wherein the wastewater pump 310 receives the wastewater from the wastewater source 306 and pumps the wastewater into the lower end 206 of the cylinder 202 through the wastewater connection end 308 at a simulated wastewater flow rate. In an aspect, wastewater flow meter 312 may be operatively connected to the wastewater insertion pipe 302 between the wastewater pump 310 and the wastewater connection end 308.

In another aspect, the simulated wastewater flow rate may be specified at a level that results in a rate of wastewater flow per unit volume of sample within the cylinder 202 that is essentially matched to the ratio of the wastewater flow per unit aeration volume of a treatment tank 208 of the wastewater biotreatment system 104. In yet another aspect, the simulated wastewater flow rate may be varied to assess the sensitivity of the efficacy of the wastewater biotreatment system 104 to fluctuations in the wastewater flow rate. In yet another aspect, the simulated wastewater flow rate may be increased to determine the maximum wastewater flow rate at which the wastewater biotreatment system 104 may still function with acceptable efficacy.

In an aspect, the wastewater source 306 may contain actual samples of wastewater obtained from an industrial wastewater flow. In another aspect, the wastewater may be a synthetic wastewater mixture having a composition of compounds with comparable concentrations to previously measured wastewater samples. In yet another aspect, the wastewater may be a synthetic mixture of compounds in which the compound species and concentrations are specified to assess the capability of the wastewater biotreatment system 104 to remove the specific compounds from the wastewater.

The wastewater source 306 may be any liquid container suitable for the transportation and storage of wastewater including, but not limited to, a chemical tote and a carboy. In another aspect, the wastewater source may be a connection to the wastewater stream of the industrial process at the facility at which the wastewater biotreatment system 104 is located.

The total volume of wastewater stored within the wastewater source 306 may be any volume that may be transported to the location of the wastewater biotreatment system 104. In addition, the total volume of wastewater may be selected to be a volume sufficient to supply an assessment of the wastewater biotreatment system 104 using the core column simulation device 100 without having to change containers.

g. Recirculation Subsystem

The recirculation subsystem 116 may recirculate the fluid within the internal volume 201 of the column simulation subsystem 102 at a simulated recirculation rate representative of an internal anoxic recycle rate of the wastewater biotreatment system 102. The recirculation subsystem 116 may include a recirculation pipe 502 comprising a recirculation inlet end 504 and a recirculation outlet end 506 opposite to the recirculation inlet end 504. The recirculation outlet end 506 may be connected in fluid communication with the sample inlet pipe 240 between the sample inlet connection end 242 and the sample pump 246. The recirculation inlet end 504 may be connected in fluid communication with the upper end 204 of the cylinder 202 below the sample return connection end 232 of the sample return pipe 230. A recirculation pump 508 may be operatively connected to the recirculation pipe 502 between the recirculation inlet end 504 and the recirculation outlet end 506. The recirculation pump may receive the sample from the upper end 204 of the cylinder 202 through the recirculation inlet end 504 and may pump the sample into the sample inlet pipe 240 through the recirculation outlet end 506. A recirculation flow meter 510 may be operatively connected to the recirculation pipe 502 between the recirculation pump 508 and the recirculation outlet end 506 to monitor the simulated recirculation rate.

The sample may be recirculated through the recirculation pipe 502 at a simulated recirculation rate representative of an internal anoxic recycle rate of the wastewater biotreatment system 104. In an aspect, the simulated recirculation rate may be determined by scaling the internal anoxic recycle rate of the wastewater biotreatment system 104 by the ratio of the internal volume 201 of the cylinder 202 divided by the aeration volume 238 of the full-scale wastewater biotreatment system 104. In other aspects, the simulated recirculation rate may be varied to assess the sensitivity of the efficacy of the wastewater biotreatment system 104 to fluctuations in the internal anoxic recycle rate, or to determine the minimum and maximum internal anoxic recycle rates at which the wastewater biotreatment system 104 may function at acceptable efficacy.

h. Gas Emission Subsystem

A gas emission subsystem 118 may release a gas mixture from the column simulation subsystem 102. The gas emission subsystem 118 may include a gas vent pipe 216 that includes a gas connection end 218 and a gas outlet end 220 opposite to the gas connection end 218. The gas connection end 218 may be connected in fluid communication with the headspace 266 within the upper end 204 of the cylinder 202. The gas outlet end 220 may open to the atmosphere. In an aspect, gas connection end 218 of the gas vent pipe 216 may be attached to the upper end 204 of the cylinder 202 near a maximum height of the cylinder 202.

The gas emission subsystem 118 may also include a gas sample port 222 comprising a gas sample pipe 224 connected in fluid communication with the gas vent pipe 216 at a sample extraction end 226 and to a gas analysis device (not shown) at the sample outlet end 228. A valve 268 may be operatively connected within the gas sample pipe 224 between the sample extraction end 226 and the sample outlet end 228.

i. Measurement Subsystem

A measurement subsystem 120 may monitor at least one property of at least one fluid associated with the assessment performed by the column simulation device 100. Non-limiting examples of suitable properties monitored by the measurement subsystem 120 include mixed liquor suspended solids (MLSS), mixed liquor volatile suspended solids (MLVSS), pH, dissolved oxygen concentration, temperature, pressure, flow rate, conductivity, chemical oxygen demand, phenol concentration, concentration of ammonia and related compounds, turbidity, dissolved benzene concentration, dissolved VOC concentration, dissolved benzene and VOC concentration, benzene gas concentration, VOC gas concentration, and benzene and VOC gas concentration. The one or more properties may be monitored within one or more fluids within the column simulation device 100 including, but not limited to a gas from the gas vent pipe 216, the fluid within the interior volume 201 of the cylinder 202, the fluid comprising an aqueous suspension of biomass from the sample inlet pipe 240, the mixed liquor from the sample return pipe 230, the atmospheric air combined with calibration sample gas from the aeration pipe 252, the wastewater from the wastewater insertion pipe 302, and the fluid from the recirculation pipe 502.

The measurement system may include any known instrument suitable for measuring one of the properties of a fluid. Non-limiting examples of suitable instruments include a gas chromatograph, a dissolved oxygen monitor, a pressure sensor, a flow meter such as a rotameter, a thermometer, a thermocouple, a pH meter, a volt meter, and a resistance electrode.

Referring back to FIG. 1, several specific examples of aspects of the measurement system are illustrated and labeled as 120a-h. The flow of a fluid such as activated sludge into the column simulation subsystem 102 may be monitored at 120a by measuring at least one property including, but not limited to temperature, pH, flow rate, and dissolved oxygen concentration. Similar properties of a fluid may be monitored at 120b, 120c, and 120f, and 120g. At least one property including, but not limited to, the gas composition including benzene or VOC concentration may be monitored at 120c, 120e, and 120g. Properties of the sample within the column simulation subsystem 102 may be monitored at any location within the subsystem 102 to assess operating conditions and the efficacy of the simulated operation of the wastewater biotreatment device 104. Non-limiting examples of suitable operating conditions to be monitored at 120h include mixed liquor suspended solids (MLSS), mixed liquor volatile suspended solids (MLVSS), pH, dissolved oxygen concentration, temperature, pressure, flow rate, conductivity, chemical oxygen demand, phenol concentration, concentration of ammonia and related compounds, turbidity, and dissolved benzene or VOC concentration.

j. Wastewater Biotreatment System

The wastewater biotreatment system 104 may be any known biotreatment device, system or facility. One non-limiting example of a suitable wastewater biotreatment system 104 is an activated sludge wastewater biotreatment system. In one aspect, the wastewater biotreatment system 104 may be highly acclimated to benzene or VOC biodegradation, making the system 104 more suitable for the process of benzene or VOC elimination from the off-gases from an industrial process.

For example, the wastewater biotreatment system 104 may be a conventional activated sludge system in which the secondary clarifier is integrated into the bioreactor, making this configuration effective at nitrification-denitrification processes. In addition, the relatively deep bioreactors and relatively low surface areas further render the system effective at the removal of biodegradable volatile organic carbon (VOC) constituents from industrial wastewater streams. Specific examples of activated sludge systems with integrated secondary clarifiers are described in detail in U.S. Pat. Nos. 5,766,459, 5,830,351, and 6,224,773, all of which are hereby incorporated by reference in their entirety.

In another aspect, an instrumented wastewater biotreatment system may include the core column simulation device 100 described above operatively connected to a wastewater biotreatment device 104.

II. Methods of Assessing Efficacy of Wastewater Biotreatment System

The core column simulation device 100 described above may be used for assessing an efficacy of a wastewater treatment system 102. Non-limiting examples of efficacies suitable for assessment using the core column simulation device 100 include efficiency of nitrification/denitrification processes, and the biodegradation or digestion of biodegradable volatile organic compounds such as benzene or VOC.

In one aspect, a method for assessing an efficacy of a wastewater treatment system 102 includes pumping an amount of fluid at a sample extraction rate from the wastewater treatment tank 208 into the cylinder 202 through the sample inlet pipe 240 to obtain a sample inside of the cylinder 202. Once a sample is obtained, atmospheric air may be introduced into the sample through the aeration fitting 258 at a simulated aeration rate representative of an operational aeration rate in the wastewater biotreatment system 104. Wastewater may also be introduced into the sample at a simulated wastewater flow rate representative of an operational wastewater flow rate in the wastewater biotreatment system 104. The efficacy of the wastewater treatment system 104 may be monitored by measuring the composition of the off-gas emitted from the gas vent pipe 216 through the gas sample port 222 using the gas analysis device that is operatively connected to the sample outlet end 228 of the gas sample port 222. In an aspect, the gas analysis device may be detachably connected to the sample outlet end 228 of the gas sample port 222 so that the gas analysis device may be removed and used to measure the composition of other gases, such as the aeration gas introduced into the lower end 206 of the cylinder 202.

In another aspect, a calibration gas such as benzene or VOC may be introduced into the atmospheric air flowing into the aeration fitting 258 through the aeration pipe 252, and the injected benzene or VOC may be monitored in the aeration pipe 252 at one or more sample times. In this same aspect, the benzene or VOC concentration in the gas vented from gas vent pipe 216 may be monitored at one or more sample times.

A benzene or VOC elimination factor may be calculated which includes the vented benzene or VOC concentration as a percentage of the injected benzene or VOC concentration at each of the one or more sample times. By comparing this benzene or VOC elimination factor to a benzene or VOC elimination standard, the efficacy of the wastewater biotreatment system may be assessed. For example, the benzene or VOC elimination standard may include an acceptable vented benzene or VOC concentration of less than about 2% of the injected benzene or VOC concentration.

In other aspects, any one or more of an operating parameter of the core column simulation device 100 may be varied to assess a sensitivity of the efficacy of a wastewater biotreatment system 104 to variations in one or more of the operating parameters. Non-limiting examples of suitable operating parameters to vary include the dwell time of the sample within the cylinder, the simulated aeration rate, the simulated wastewater flow rate, the simulation recirculation rate, pH of the sample, temperature of the sample, biomass concentration in the sample, and the composition of the microbial species within the biomass in the sample.

EXAMPLES

The following examples are provided to demonstrate various aspects of the invention.

Example 1

Assessment of Benzene Degradation Using Core Column Simulation Device

To demonstrate the capability of a core column simulation device to assess the efficacy of benzene degradation by a full-scale activated sludge wastewater biotreatment system, the following experiment was conducted. A core column simulation device similar to the device illustrated in FIG. 2 and described in detail above was used to assess a range of benzene gas concentrations that may be eliminated from an off-gas input stream and wastewater stream by an activated sludge wastewater biotreatment system with acceptable efficacy. Acceptable efficacy in this experiment was defined as the elimination of 98% of the benzene concentration from the gas and wastewater input stream.

The main cylinder of the core column was constructed from PVC pipe with a diameter of 12 inches. The lower end of the cylinder was secured to the pavement surrounding the aeration tank of the activated sludge wastewater biotreatment system. The cylinder extended vertically to a height of about 30 feet and contained a sample column of activated sludge within the cylinder that had a height of 24 feet to match the height of the activated sludge within the aeration tank.

The core column simulation device pumped activated sludge from the aeration tank into the cylinder using a MASTERFLEX pump and returned the mixed liquor to the aeration tank using a gravity overflow pipe that opened at a height of about 3 feet over the surface of the aeration tank. The flow rate from the gravity overflow pipe was periodically monitored by measuring the time required to fill a bucket of known volume to assess the biomass recycle rate. Wastewater samples containing a known concentration of dissolved benzene were pumped from chemical totes into the core column simulation device using a second MASTERFLEX pump, and the mixed liquor from the gravity overflow pipe was periodically tested for dissolved benzene concentration.

In some experiments, the activated sludge sample was recycled within the cylinder using a biomass recycle line with a metered centrifugal pump that recirculated the sludge sample from the top of the column to the bottom of the column at an anoxic recycle rate.

Atmospheric air was introduced into an aeration fitting in the bottom of the cylinder using a compressor in series with a flow meter at a controlled aeration rate. A canister of ACS reagent grade benzene was introduced into the compressed air flow through a second flow meter at a metered concentration. A portion of the vapor exiting the top of the cylinder through an atmospheric vent was periodically analyzed for benzene concentration using a portable gas chromatograph unit (VOYAGER model, Photovac, Inc.).

Five runs of the core column simulation device were conducted; each run required about 8-10 hours to complete. Each run subjected the biomass to increasing benzene loadings, both in the gaseous and aqueous influent loading phases. The operating conditions of the core column simulation device for each run were determined by scaling the full-scale wastewater biotreatment system operating conditions by the ratio of the sample volume to aeration tank volume. The benzene detection limit of the gas chromatograph was <2 ppbv and the aqueous phase detection limit was <1 ppbv (µg/L).

TABLE 1

Operating Conditions of Core Column Simulation Device

| PARAMETER | RUN 1 | RUN 3 | | RUN 4 | | RUN 5 | |
| --- | --- | --- | --- | --- | --- | --- | --- |
| | A | A | B | A | B | A | B |
| Inlet Benzene Gas Concentration (ppbv) | 21 | 121 | 153 | 156 | 482 | 182 | 226 |
| Outlet Off-Gas Benzene Concentration (ppbv) | <2 | <2 | <2 | <2 | 13.3 | <2 | <2 |
| Benzene Vapor Removal (%) | N/A | 98.35 | 98.69 | 98.72 | 97.24 | 98.90 | 99.11 |
| Influent Aqueous Benzene (µg/L) | 109 | 129 | 129 | 137 | 137 | 245 | 245 |
| Effluent Aqueous Benzene (µg/L) | <1 | <1 | <1 | <1 | <1 | <1 | <1 |
| Dissolved Benzene Removal (%) | 99.09 | 99.22 | 99.22 | 99.27 | 99.27 | 99.59 | 99.59 |
| Inlet Raw Wastewater Flow Rate (gpm) | 0.21 | 0.21 | 0.21 | 0.21 | 0.21 | 0.35 | 0.35 |

TABLE 1-continued

Operating Conditions of Core Column Simulation Device

| PARAMETER | RUN 1 A | RUN 3 A | RUN 3 B | RUN 4 A | RUN 4 B | RUN 5 A | RUN 5 B |
|---|---|---|---|---|---|---|---|
| Biomass Recycle Rate (gpm) | 0.35 | 0.35 | 0.35 | 0.35 | 0.35 | 0.35 | 0.35 |
| Anoxic Recycle Rate (gpm) | 0 | 0 | 0 | 1.1 | 1.1 | 1.1 | 1.1 |

The results of the experiments are also summarized in Table 1. Run 2 was not completed due to overheating of the portable gas chromatograph, and is not listed in Table 1. The results of the experiments as summarized in Table 1 indicated that more than 98% benzene biodegradation was achieved at loadings up to 16 times the design limit of the full-scale water biotreatment device. In Run 4B, there was breakthrough of the vapor phase benzene emissions at an inlet benzene concentration of 482 ppbv, which was almost 35 times the maximum design inlet concentration.

The results of this experiment demonstrated the feasibility of using the core column simulation device for assessing the efficacy of a full-scale water biotreatment device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A core column simulation device for assessing an efficacy of a wastewater biotreatment system, the device comprising:
    a. a column simulation subsystem for simulating an operation of the wastewater biotreatment system using a sample obtained from the wastewater biotreatment system;
    b. a sample extraction subsystem to transfer an amount of fluid comprising an aqueous suspension of biomass from the wastewater biotreatment system into a sample volume within the column simulation subsystem at a simulated extraction rate that is equivalent or representative of a full-scale volumetric rate of fluid transfer through a corresponding volume of a core of wastewater extending a total water depth within the wastewater biotreatment system, wherein the sample extraction subsystem is operatively connected to the column simulation subsystem and to the wastewater biotreatment system;
    c. a sample return subsystem to transfer an amount of mixed liquor from the column simulation subsystem to the wastewater biotreatment system at a return rate sufficient to maintain a constant amount of fluid within the sample volume, wherein the sample return subsystem is operatively connected to the column simulation subsystem and to the wastewater biotreatment system;
    d. an aeration subsystem to introduce an aeration gas into the sample volume at a simulated aeration rate that is representative of a volumetric aeration rate of the wastewater treatment system, wherein the aeration subsystem is operatively connected to the column simulation subsystem;
    e. a gas emission subsystem to release a gas mixture from the column simulation subsystem, wherein the gas emission subsystem is operatively connected to the column simulation subsystem; and,
    f. a measurement subsystem to monitor at least one property of at least one fluid associated with an assessment performed by the column simulation device, wherein the measurement subsystem is operatively connected to the column simulation subsystem.

2. The device of claim 1, wherein the aeration gas is chosen from air, oxygen, at least one volatile organic compound gas, or any combination thereof.

3. The device of claim 1, further comprising a wastewater insertion subsystem to introduce an amount of wastewater into the sample volume within the column simulation subsystem at a simulated wastewater flow rate that is representative of a wastewater flow rate of the wastewater biotreatment system, and wherein the wastewater insertion subsystem is operatively connected to the column simulation subsystem.

4. The device of claim 3, further comprising a calibration gas insertion subsystem to introduce a calibration gas comprising at least one volatile organic compound into the sample volume within the column simulation subsystem at a calibration gas insertion rate, wherein the calibration gas insertion subsystem is operatively connected to the aeration subsystem.

5. The device of claim 4, further comprising a recirculation subsystem to recirculate the fluid within the sample volume of the column simulation subsystem at a simulated recirculation rate representative of an internal anoxic recycle rate of the wastewater biotreatment system, wherein the recirculation subsystem is operatively connected to the column simulation subsystem.

6. The device of claim 5, wherein one or more operating parameters may be altered in order to assess a sensitivity of the efficacy of the wastewater biotreatment system, wherein the one or more operating parameters are chosen from simulated extraction rate, simulated aeration rate, simulated wastewater flow rate, calibration gas insertion rate, simulated recirculation rate, wastewater composition, temperature of the sample volume, pH of the sample volume, or dissolved oxygen of the sample volume.

7. An instrumented wastewater biotreatment system comprising the core column simulation device of claim 1 operatively connected to the wastewater biotreatment system.

* * * * *